United States Patent
Dewey et al.

(10) Patent No.: US 7,689,720 B2
(45) Date of Patent: Mar. 30, 2010

(54) METHOD FOR ESTABLISHING AND MAINTAINING A SHARED VIEW OF TIME IN A PEER-TO-PEER NETWORK

(75) Inventors: Jeremy L. Dewey, Redmond, WA (US); Christian Huitema, Clyde Hill, WA (US); Xiaohai Zhang, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1489 days.

(21) Appl. No.: 10/702,405

(22) Filed: Nov. 5, 2003

(65) Prior Publication Data
US 2005/0108373 A1 May 19, 2005

(51) Int. Cl.
*G06F 15/16* (2006.01)
*G06F 15/177* (2006.01)
(52) U.S. Cl. ............... 709/248; 709/221; 709/205
(58) Field of Classification Search ............... 709/248
See application file for complete search history.

(56) References Cited

U.S. PATENT DOCUMENTS

| | | | |
|---|---|---|---|
| 5,386,542 A | | 1/1995 | Brann et al. |
| 5,815,418 A | * | 9/1998 | Dolazza et al. ............ 702/86 |
| 5,907,685 A | | 5/1999 | Douceur |
| 5,987,376 A | | 11/1999 | Olson et al. |
| 6,012,096 A | | 1/2000 | Link et al. |
| 6,148,383 A | | 11/2000 | Micka et al. |
| 6,346,048 B1 | * | 2/2002 | Ogawa et al. ............ 463/42 |
| 6,581,110 B1 | | 6/2003 | Harif et al. |
| 6,725,278 B1 | * | 4/2004 | Gonzalez ............ 709/248 |
| 2002/0078243 A1 | | 6/2002 | Rich et al. |
| 2002/0188881 A1 | | 12/2002 | Liu et al. |
| 2003/0130040 A1 | * | 7/2003 | Dripps ............ 463/42 |

OTHER PUBLICATIONS

Simpson, "A Stream-based Time Synchronization Technique For Networked Computer Games," Jul. 30, 2002, www.mine-control.com, p. 2 of 3.*
Erdelsky, P., The Birthday Paradox, EFG, at http://www.efgh.com/math/birthday.htm (Mar. 8, 2002).
Red-Black Tree, National Institute of Standards and Technology, at http://www.nist.gov/dads/HTML/redblack.html (Mar. 5, 2002).

(Continued)

*Primary Examiner*—Bunjob Jaroenchonwanit
*Assistant Examiner*—Richard G Keehn
(74) *Attorney, Agent, or Firm*—Marshall, Gerstein & Borun LLP (57) ABSTRACT

A shared concept of time, called "graph time," is agreed upon by all nodes within a graph. Each node maintains its own local delta representative of a difference in the node's system clock and graph time. Upon connecting to a neighbor node in a graph, a node is sent graph time as perceived by the neighbor node. In accordance with an embodiment, the node assumes that the lag time in receiving the graph time from the neighbor node is one-half of the lag time between the request for the connection and the receipt of the graph time. Graph time as sent by the neighbor node is added to one-half of the total delay and the sum is subtracted from the node's system time to calculate the delta for the node requesting connection.

6 Claims, 8 Drawing Sheets

OTHER PUBLICATIONS

Dabek, F., et al., Building Peer-to-Peer Systems With Chord, a Distributed Lookup Service, at MIT Laboratory for Computer Science, 6 pages, at http://pdos.lcs.mit.edu/chord.

Rowstron et al., SCRIBE: The design of a large-scale event notification infrastructure, at Microsoft Research, Ltd., St. George House and Rice University, 20 pages.

Ellison, C., SPKI Requirements, (The Internet Society 1999), at http://www.ietf.org/rfc/rfc2692.txt?number=2692 (Aug. 6, 2001).

Rowstron et al., Storage management and caching in PAST, a large-scale, persistent peer-to-peer storage utility, at Microsoft Research, Ltd., St. George House and Rice University, 14 pages.

Langley, A., The Freenet Protocol, The Free Network Project, at http://freenet.sourceforge.net/index/php?page=protocol (May 21, 2001).

Lai, K. et al., Measuring Link Bandwidths Using a Deterministic Model of Packet Delay, at Department of Computer Science at Stanford University, 13 pages.

Druschel, P., et al., PAST: A large-scale, persistent peer-to-peer storage utility, at Rice University and Microsoft Research, 6 pages.

Ellison, C., et al., Simple Public Key Certificate, (Internet Draft 1999), at http://www.world.std.com/~cme/spki.txt (Aug. 6, 2001).

Rowstron et al., Pastry: Scalable, distributed object location and routing for large-scale peer-to-peer systems, at Microsoft Research, Ltd., St. George House and Rice University, 20 pages.

Ellison, C., et al., SPKI Certificate Theory, (The Internet Society 1999), at http://www.ietf.org/rfc/rfc2693.txt?number=2693 (Aug. 6, 2001).

* cited by examiner

METHOD FOR ESTABLISHING AND MAINTAINING A SHARED VIEW OF TIME IN A PEER-TO-PEER NETWORK

TECHNICAL FIELD OF THE INVENTION

The present invention pertains generally to computer networks and, more particularly, to peer-to-peer computer networks.

BACKGROUND OF THE INVENTION

Enabling group communication is a popular application of computer networks. Groups of people use computer networks to share every kind of digital data from simple text and static images to encoded audio and video and more specialized data that enables real-time collaboration and multi-player games.

In general, a node is an application on a peer-to-peer network, typically identified by an Internet Protocol (IP) address, a port, and a name. A graph is an interconnection of such nodes on a peer-to-peer network. A peer-to-peer network is a simple, small type of network in which each node has the ability for equivalent capabilities and responsibilities. Each node can be a server and each can be a client at the same time. This differs from a client-server architecture in which some computers are dedicated to serving others.

In a peer-to-peer network, there are many time-based events. For many events, it is preferred that all nodes connected to the network share a common view of time. Such concepts as data lifetime, membership lifetime, graph partition detection, and graph partition recovery all hinge upon the fact that the nodes in the peer-to-peer network have a common concept of time among themselves.

As one example of a problem that may occur if nodes do not have a common concept of time can be found in data expiration. It is convenient if data across the network expires for each node at approximately the same time. In general, for distributed networks such as a peer-to-peer network, data will be pushed to the graph and will be removed from each node based upon an expiration time. If the expiration times are not approximately the same, then the data may exist on some nodes, and may be expired on others. This phenomenon may cause a number of problems, such as synchronization issues between the nodes.

One method for handling common time between nodes is use of Network Time Protocol (NTP). NTP is a protocol that can synchronize clocks on local computers with radio or atomic clocks on the Internet. While this system works well for its intended purpose, constantly synchronizing all nodes on a graph can be an expensive process. In addition, not all nodes may be connected to the Internet, and thus may not be able to take advantage of NTP, or a node may not be configured to synchronize with an NTP server.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a shared concept of time, called "graph time," is agreed upon by all nodes within a graph. Each node maintains its own delta representative of a difference in the node's system clock and graph time. Upon connecting to a neighbor node in a graph, a node is sent graph time as perceived by the neighbor node. In accordance with an embodiment, the node assumes that the lag time in receiving the graph time from the neighbor node is one-half of the lag time between the request for the connection and the receipt of the graph time. Graph time as sent by the neighbor node is added to one-half of the total delay and the sum is subtracted from the node's system time to calculate the delta for the node requesting connection.

In accordance with an embodiment, if a node's delta has never been set, it uses the calculated value as its new delta. However, in accordance with an embodiment, if the node's delta has been set in the past, it uses a weighted average of its current calculated delta and the previously calculated deltas.

In accordance with an embodiment, a shift factor is utilized to minimize the delta for all nodes in a graph. In this manner, the average of the delta values for each of the nodes is minimized. In accordance with an embodiment, in order to provide this decrease in delta, during a shifting period, the calculated delta is decreased by a fraction of the time between the present connection and the previous connection, divided by the shift period. If the time between connections is greater than the shift period, then the delta is set to zero.

Other features of the invention will become apparent from the following detailed description when taken in conjunction with the drawings, in which:

DETAILED DESCRIPTION

Prior to proceeding with a description of the various embodiments of the invention, a description of a computer and networking environment in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
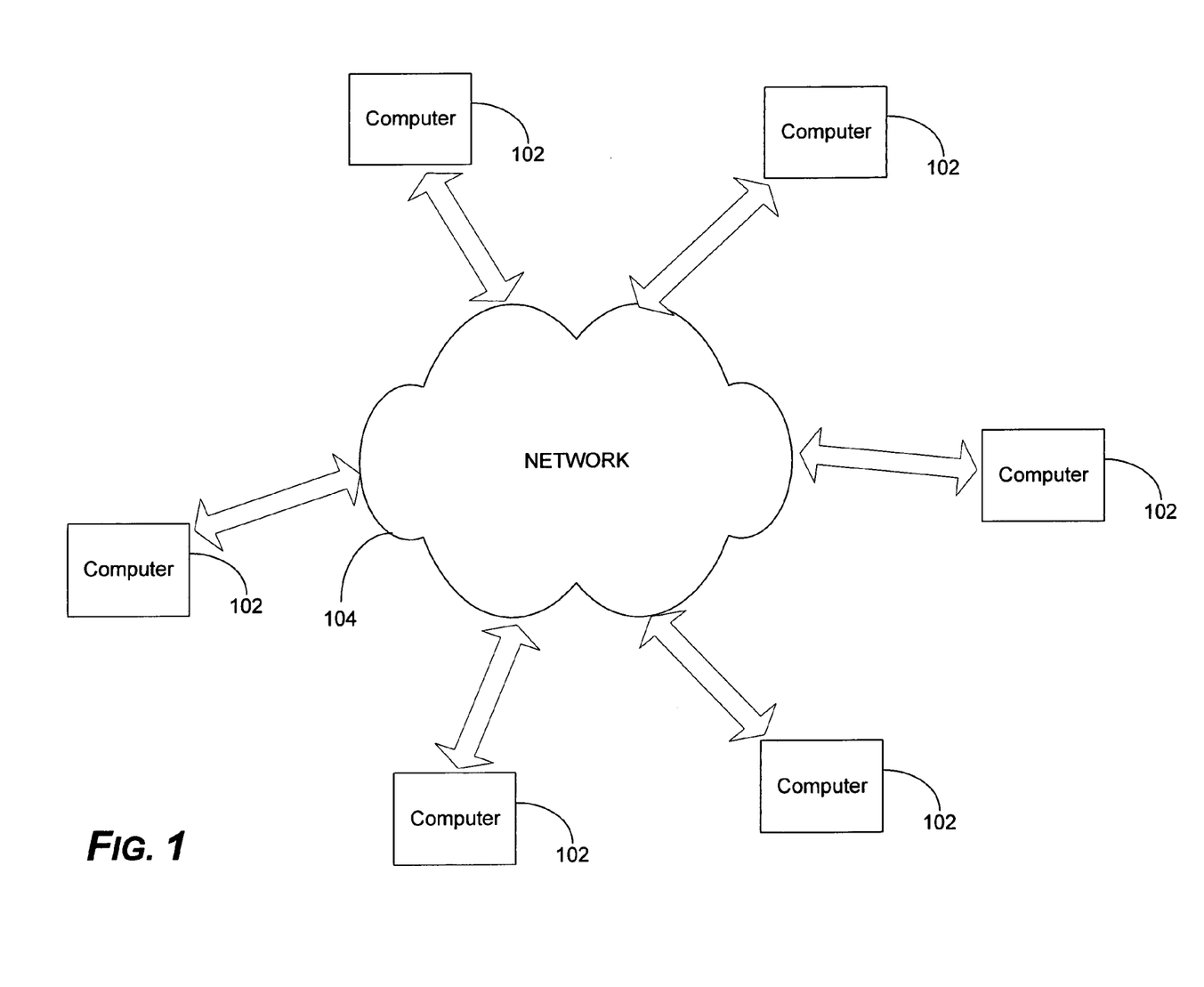
FIG. 1 is a schematic diagram illustrating computers connected by a network.

Referring now to the drawings, in which like reference numerals represent like parts throughout the several views, an example of a computer networking environment suitable for incorporating aspects of the invention is described with reference to FIG. 1. The example computer networking environment includes several computers 102 communicating with one another over a network 104, represented by a cloud. The network 104 may include many well-known components, such as routers, gateways, hubs, etc. and allows the computers 102 to communicate via wired and/or wireless media. When interacting with one another over the network 104, one or more of the computers 102 may act as clients, servers or peers with respect to other computers 102. Accordingly, the various embodiments of the invention may be practiced on clients, servers, peers or combinations thereof, even though specific examples contained herein may not refer to all of these types of computers.

Figure 2:
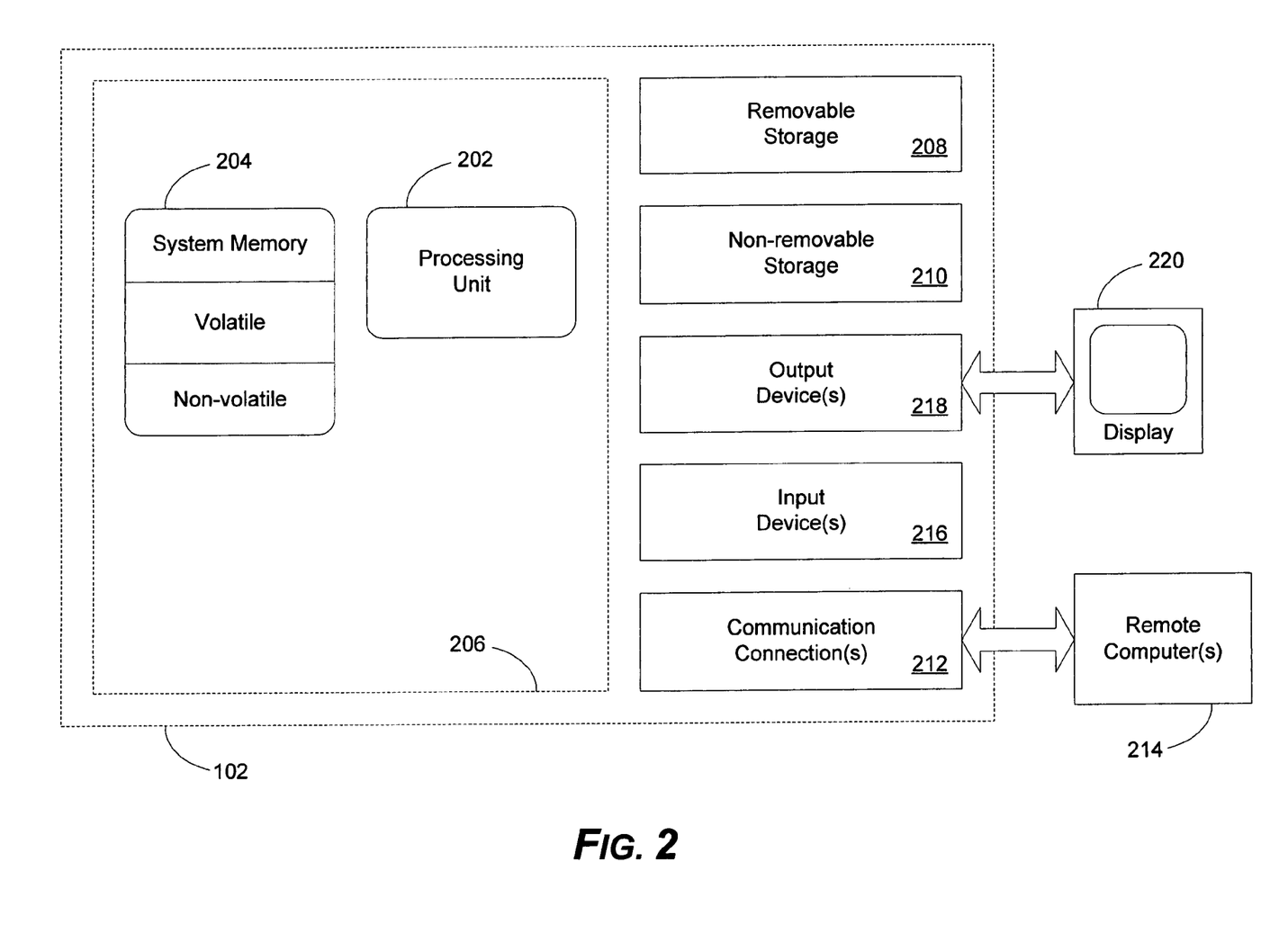
FIG. 2 is a schematic diagram generally illustrating an exemplary computer system usable to implement an embodiment of the invention.

Referring to FIG. 2, an example of a basic configuration for the computer 102 on which aspects of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory) or some combination of the two. This most basic configuration is illustrated in FIG. 1 by dashed line 206.

The computer 102 may also have additional features/functionality. For example, computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to store the desired information and which can be accessed by the computer 102. Any such computer storage media may be part of computer 102.

The computer 102 preferably also contains communications connections 212 that allow the device to communicate with other devices such as remote computers 214. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 216 such as a keyboard/keypad, mouse, pen, voice input device, touch input device, etc. Output devices 218 such as a display 220, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
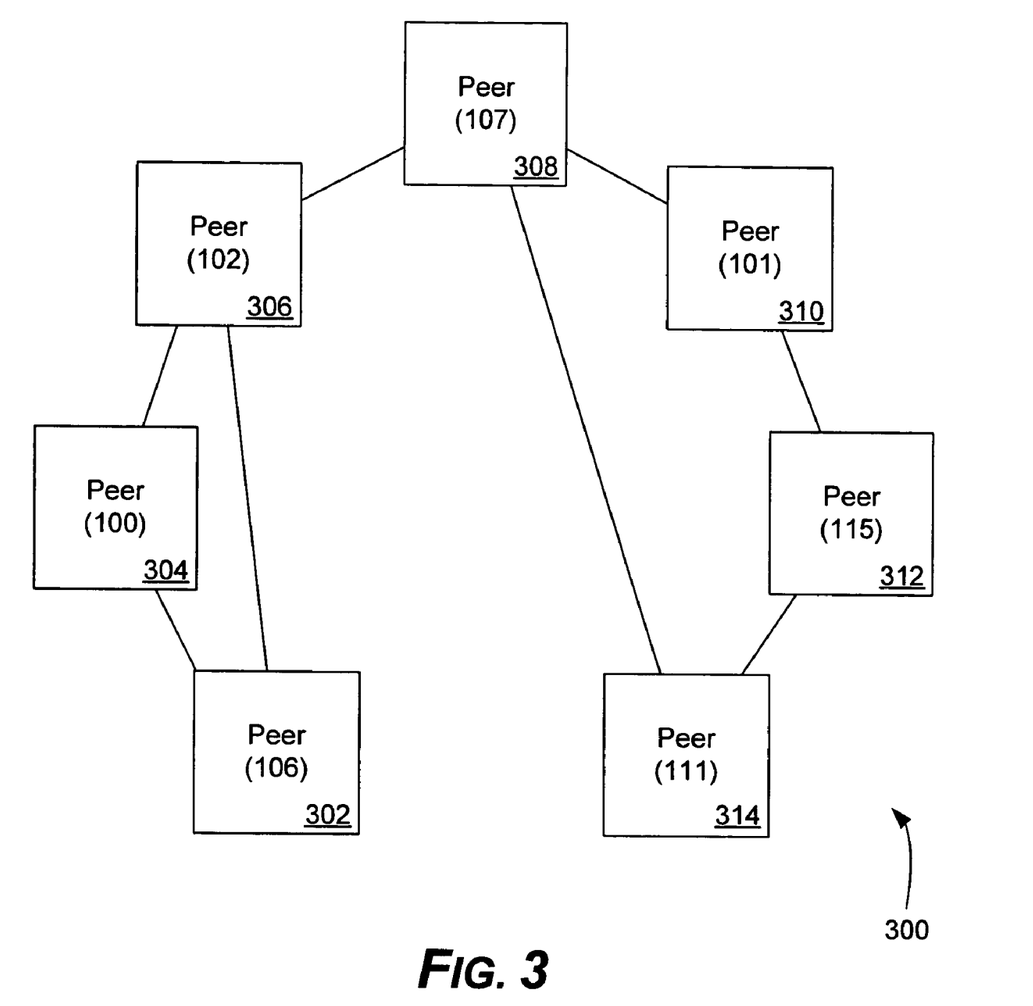
FIG. 3 is a schematic diagram depicting peers in an example peer-to-peer graph.

In an embodiment of the invention, joining a peer-to-peer (P2P) communications group includes joining a graph of connected peers or nodes. Each node may be, for example, an application running on a computer (e.g., the computer 102). FIG. 3 illustrates an example peer-to-peer (P2P) graph suitable for incorporating aspects of the invention. Each node or peer 302, 304, 306, 308, 310, 312, 314 may communicate with any other peer 302, 304, 306, 308, 310, 312, 314 in the peer-to-peer graph 300 either directly or indirectly. For example, peer 302 may communicate with peer 306 directly, but in order to communicate with peer 314, data first propagates through peer 306 and then peer 308. Peer 308 may communicate with peer 314 directly, alternatively, peer 308 may communicate indirectly with peer 314 via peer 310 and then peer 312.

A single computer may enable more than one peer, for example, peer 302, peer 304 and peer 306 may interact with the computer network 104 from the same computer 102. A single peer may be enabled by more than one computer, for example, peer 312 may interact with the computer network 104 from a distributed computing environment including several computers 102. Peer-to-peer connections are independent of an underlying data transport mechanism, for example, the connection between peer 314 and peer 308 may be implemented utilizing Transmission Control Protocol (TCP) and Internet Protocol Version 4 (IPv4), the connection between peer 314 and peer 312 may be implemented utilizing TCP and Internet Protocol Version 6 (IPv6), and the connection between peer 302 and peer 304 may be ultimately implemented as a copy of one memory location to another within the same computer 102. Each peer 302, 304, 306, 308, 310, 312, 314 may participate in more than one peer-to-peer graph (not shown in FIG. 3).

Figure 4:
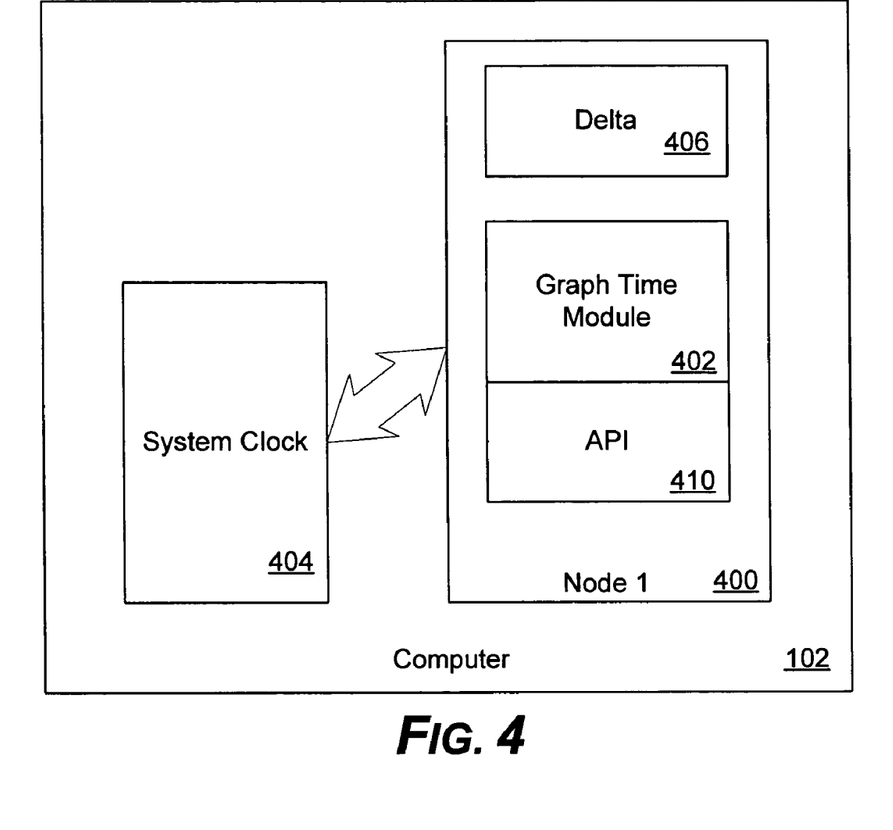
FIG. 4 is a schematic diagram illustrating a modular software architecture in accordance with an embodiment of the invention.

FIG. 4 illustrates an example modular software architecture in accordance with an embodiment of the invention. The computer 102 may include a node 400. In the drawings, the node 400 is illustrative of a node that may be used, for example, in the graph 300, and thus the description of the node 400 may be generically applied to some or all of the nodes 302-314 in FIG. 3. Although shown as installed on a single computer (i.e., the computer 102), a node 400 may be distributed across multiple computers, or multiple nodes may be included on a single computer such as the computer 102.

The node 400 includes a graph time module 402 associated therewith. Alternatively, the graph time module 402 may be a component of an operating system of the computer 102, or may reside as a separate program on the computer 102 or on a separate computer.

The graph time module 402 and/or the node 400 are configured to communicate with a system clock 404 for the computer 102. The system clock 404 may maintain time for the computer 102, may be implemented in hardware or software, and may reside separately from the computer 102 or as part of the node 400.

The system clock 404 for each node 400 in the graph 300 maintains its own time. In accordance with an embodiment of the invention, the system clocks 404 may maintain time in Universal Coordinated Time (UTC). As is known, UTC is the same as Greenwich Mean Time (GMT), and is the mean solar time of the meridian of Greenwich, England, used as the basis for calculating standard time throughout the world. As an example, the system clocks 404 associated with each node or peer 302-314 may maintain time expressed as a 64 bit number, where each unit represents 100 nanoseconds relative to GMT.

Although each system clock 404 utilizes the same system for maintaining time, most likely in any given peer-to-peer network, such as the graph 300, the system clocks 404 for the nodes or peers 302-314 are not synchronized. In the example shown in FIG. 3, the number in parenthesis for each peer 302-314 represents the numerical equivalent of minutes for the system clock 404 associated with the respective peer, with the time of day not being relevant to this example. In the graph 300, the time variation between the peers 302-314 is 15 minutes, with the greatest variation being between the peer 304, showing a time of 100, and the peer 312, showing a time of 115. As stated above in the Background section of this disclosure, this time variance may cause problems in operation of the infrastructure of the graph 300.

In accordance with an embodiment of the present invention, a concept of graph time is defined wherein the nodes or peers 302-314 have a shared concept of time that is agreed upon by all nodes 400 within the graph 300. As further described below, each node 302-314 maintains its own delta representative of a difference in the node's time kept by its system clock 404 and graph time.

In accordance with an embodiment, graph time is initialized by the node 400 which creates the graph 300. Graph time is set according to the system clock 404 of the node 400. As an example, for the graph 300 in FIG. 3, it is assumed that the node 310 initialized the graph 300, and thus at the snapshot of time shown in FIG. 3, the graph time is 101.

In accordance with an embodiment of the invention, the other nodes 302-308, 312 and 314 share the concept of graph time with the node 310 by maintaining a local delta 406 (FIG. 4) that is a calculated value that represents the difference between the particular node's time kept via its system clock 404 and the agreed-upon graph time. The delta 406 is calculated by the graph time module 402, as is further described below.

Therefore, each node 400 stores its delta 406 which is used to convert between graph time ("graph_time") and the time maintained in the system clock 404 of the node ("system_time"), such that:

$$graph\_time = system\_time - delta$$

As can be understood, the delta may be negative or positive, depending on where the system time for the node 400 is relative to graph time.

In accordance with an embodiment of the invention, the local delta 406 for a node 400 is set or adjusted each time a new outgoing connection is formed. The delta 406 may be calculated at other times, such as on an interval, but calculation at connection time works particularly well in that it requires very little additional overhead for the graph 300.

Typically, when forming a connection, a connect message 500 (FIG. 5) is sent from the connecting node 400 and a welcome message 502 is received by the node 400 requesting the connection. The welcome message 502 typically is sent by the node to which the connecting node 400 is trying to connect, in the embodiment shown in FIG. 5, a neighbor node 408. The neighbor node 408 generically represents a node to which the node 400 requests a connection and, as with the node 400, may for example be any of the nodes 302-314 in the graph 300. In accordance with an embodiment of the invention, the neighbor node 408 sends its perceived graph time 504 along with the welcome message 502.

Figure 5:
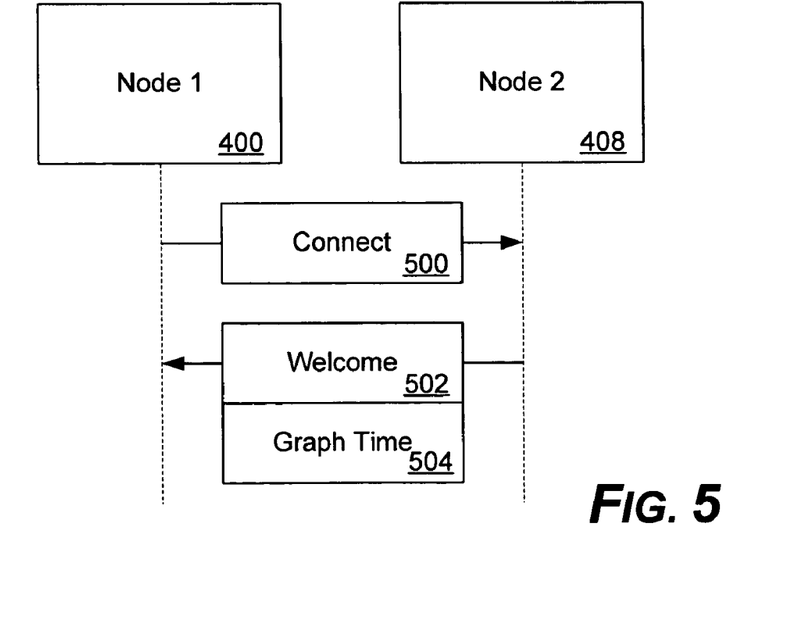
FIG. 5 is a block diagram representing a node connecting to a graph usable to implement an embodiment of the invention.

In accordance with an embodiment of the invention, the node 400 that is requesting a connection calculates its delta by using the perceived graph time 504 sent by the neighbor node 408 in the connection attempt. However, because the perceived graph time 504 represents the graph time perceived by the neighbor node 408 when the welcome message 502 was queued to be sent by the neighbor node, and there is some lag between that queue time and the actual receipt of the perceived graph time 504 by the node 400, the node 400 is not exactly certain of the perceived graph time 504 relative to its own system time. In other words, the node 400 is not certain of the exact latency of the connection with the neighbor node 408, and cannot determine exactly how long it has been since the neighbor node 408 has created the perceived graph time 504.

In accordance with an embodiment of the invention, to account for the unknown latency, an assumption is made that the latency is one half of the time between the request for the connection and the receipt of the graph time. The node 400 tracks the time in which it queues its connect message 500 (system_CONNECT), and then the local system time at which the welcome message 502 is processed (system_WELCOME). Because the difference in these two times represents a round trip between the node 400 and the neighbor node 408, in accordance with an embodiment, it is assumed that one-half of that period is the amount of time that it took from the queuing of the welcome message to the processing of the welcome message (system_WELCOME time). Using this information, a delta value ("neighbor_delta") may be calculated using the perceived graph time ("graph_time") of the neighbor node 408, the system time of the node 400 ("system_time"), and the delay in the round trip between requesting the connection and processing the welcome message 502 as follows:

$$neighbor\_delta = system\_time - (graph\_time + \tfrac{1}{2} delay)$$

where delay=system_WELCOME−system_CONNECT

The calculation above calculates a "neighbor_delta" because the delta is calculated based upon the perception of the graph time of the neighbor node 408.

The neighbor_delta may be calculated at the time of the processing of the welcome message 502 (i.e., at system_WELCOME). As such, system_time at that instance is equal to system_WELCOME, and the formula for calculating neighbor_delta may be rewritten as follows:

$$\text{neighbor\_delta} = \text{system\_WELCOME} - ((\text{system\_WELCOME} - \text{system\_CONNECT})/2 + \text{graph\_time})$$

Figure 6:
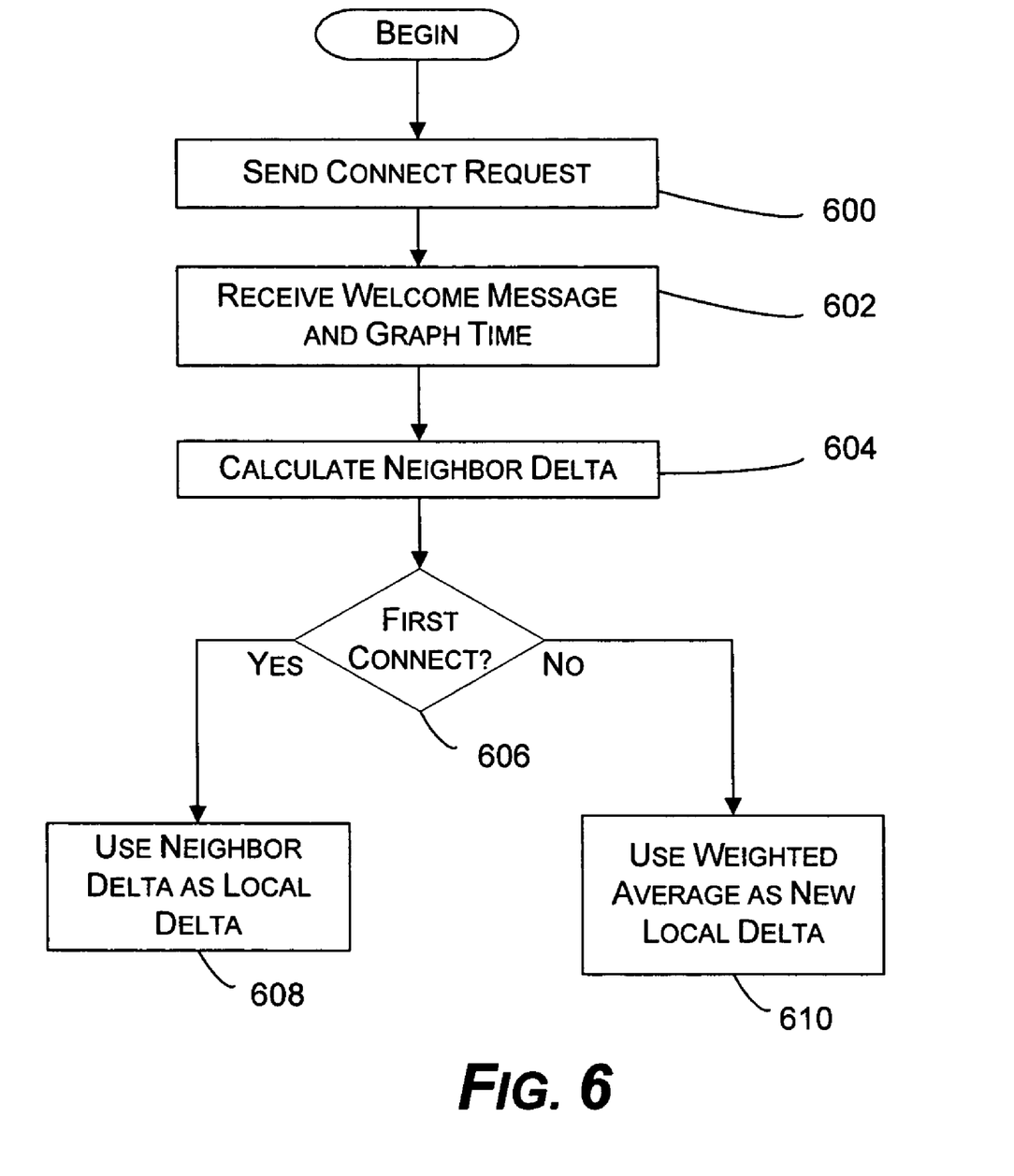
FIG. 6 is a flow diagram generally representing steps for establishing a local delta relative to graph time in accordance with an embodiment of the invention.

FIG. 6 shows steps for calculating a local delta for a node (e.g., the node 400) in accordance with an embodiment of the invention. Beginning at step 600, the node 400 sends the connect request 500. At step 602, the node 400 receives the welcome message 502 along with the graph time 504.

At step 604, the graph time module 402 calculates the neighbor_delta as described above. If this connection attempt is a first connection attempt by the node 400, then in accordance with an embodiment of the invention, step 606 branches to step 608 where the neighbor_delta is set as the local delta for the node 400 (i.e., it is stored as the delta 406). If this is not the first connection attempt, then step 606 branches to step 610, where a weighted average of the current local delta 406 and the neighbor_delta is used to calculate the new local delta.

The weighted average of step 610 above may be calculated by many different methods. In one embodiment, calculation of the weighted average takes into account the fact that a local delta already exists for the node 400, and that the neighbor_delta is calculated based upon the perceived graph time of a single neighbor node 408. Thus, the existing local delta is be given a heavier weighting than the neighbor_delta. As one example of how to perform such a weighted average, the following formula may be used:

$$\text{new local delta} = \text{old local delta} * ((x-1)/x) + \text{neighbor\_delta} * (1/x))$$

X is some weighting constant, such as in the range from 4-16. If the weighting constant is too small, the neighbor_delta will be weighted too heavily, and if too large will not have much effect on the new local delta value. Thus, a weighting from 4-16, or even more preferably 4-8 is typically considered to be a good value. The value of 4-8 works particularly well in that most graphs, such as the graph 300, the number of neighbors is typically 3-4, and if the value is 4, then the new local delta will generally include neighbor_delta information from each of its neighbors, and with 8 will take the last 8 connections into account, which increases the likelihood that connections with each of its neighbors will be utilized in averaging. Other values may be used in accordance with a particular graph or a desired result.

Figure 7:
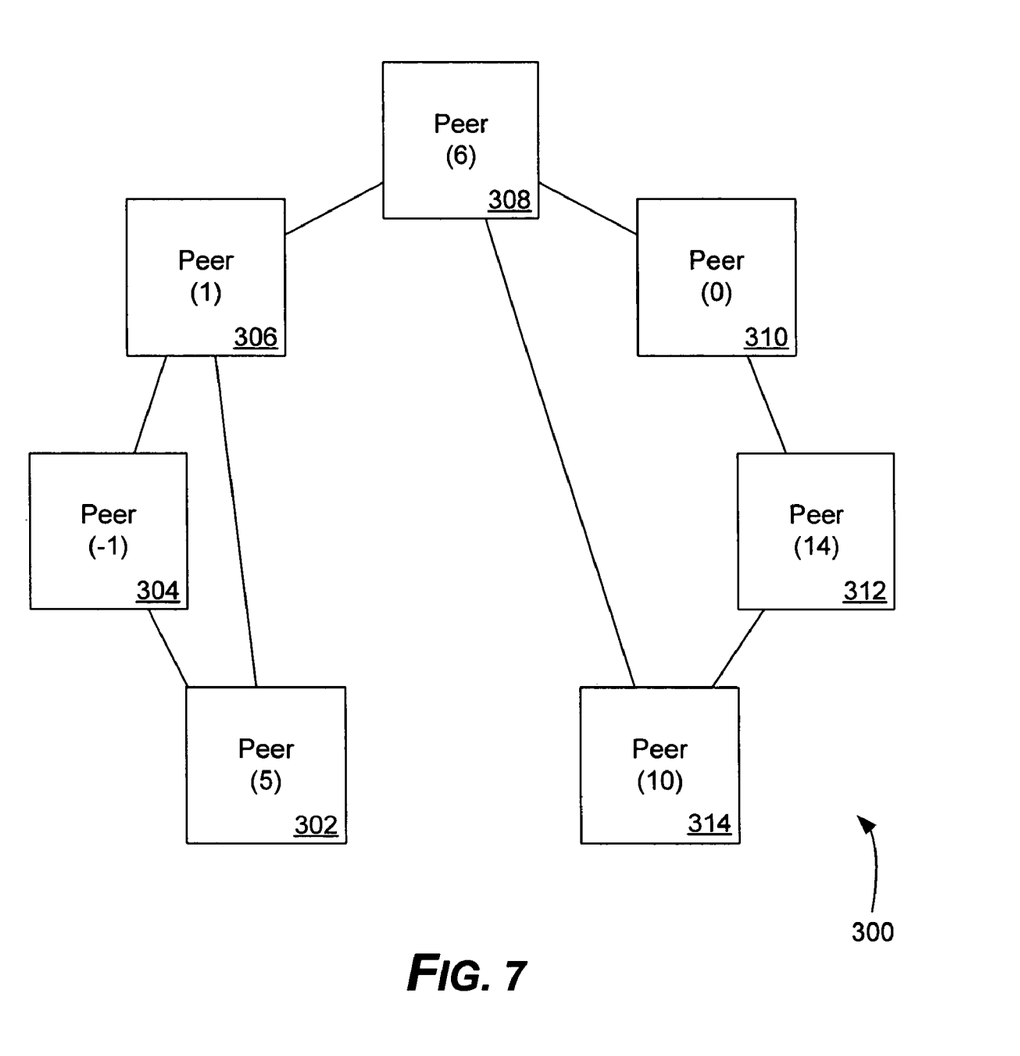
FIG. 7 is a schematic diagram of the graph of FIG. 3, showing delta values that may be calculated in accordance of the invention.

Thus, in accordance with the method described above, local deltas 406 are calculated for each of the peers, such as the peers 302-314. A representation of local deltas 406 for the nodes 302-314 is shown in FIG. 7. In this example, the peer 310 initiated the graph 300, and the deltas for the other peers were calculated from that peer. In the example shown, the deltas exactly represent the difference between the snapshot of time shown in FIG. 3 and deltas that would be calculated from that exact snapshot. However, because the delta values are calculated by connections with neighbors and there may be distances between those neighbors and the initiating node (in this example, the node 310), there may be some variance, especially as the nodes that are farther away from the initiating node 310. However, in practice, the inventors have found that the variance across a graph 300 even with a large number of peers is typically less than 10 seconds, which is sufficient for most operations of a graph 300.

As an example of how the graph time can be beneficial, creation, modification, and expiration times of shared data in the graph 300 may be set in accordance with graph time. An application may set the expiration time by calculating when the data should expire in terms of its own system time, and then convert it to normalized graph time by utilizing the graph time module 402. To this end, an application programming interface 410 (FIG. 10) may be provided on the graph time module 402 for a node 400 or other application to access for utilizing graph time.

When the expiration time of the data is reached, each node 400 having the data stored therewith removes the shared data from its cache or other data store. If the nodes 400 do not have a shared concept of time through the use of graph time as described herein, each node 400 would expire the data at different times, which could cause each node to have a different view of the shared data. As such, problems may occur, such as inaccurate synchronization between the nodes.

As can be seen in FIG. 7, the delta values in the example given range from (−1) to 14. As described above, the delta values may be negative or positive based upon the system time of a particular node 400 relative to graph time. However, in accordance with an embodiment of the invention, a process is provided through which local deltas are shifted so that the average local delta approaches zero. In accordance with an embodiment of the invention, a shifting factor is provided that shifts the deltas over time toward zero. The shifting factor may be determined, for example, based upon the length between new outgoing connections for a node 400. As an example, a shifting period may be defined which serves as the denominator in a fraction. The numerator for the fraction is the length between new outgoing connections. The fraction represents the amount by which the local delta will be decreased when it is calculated so that the average of the local deltas decreases toward zero.

Figure 8:
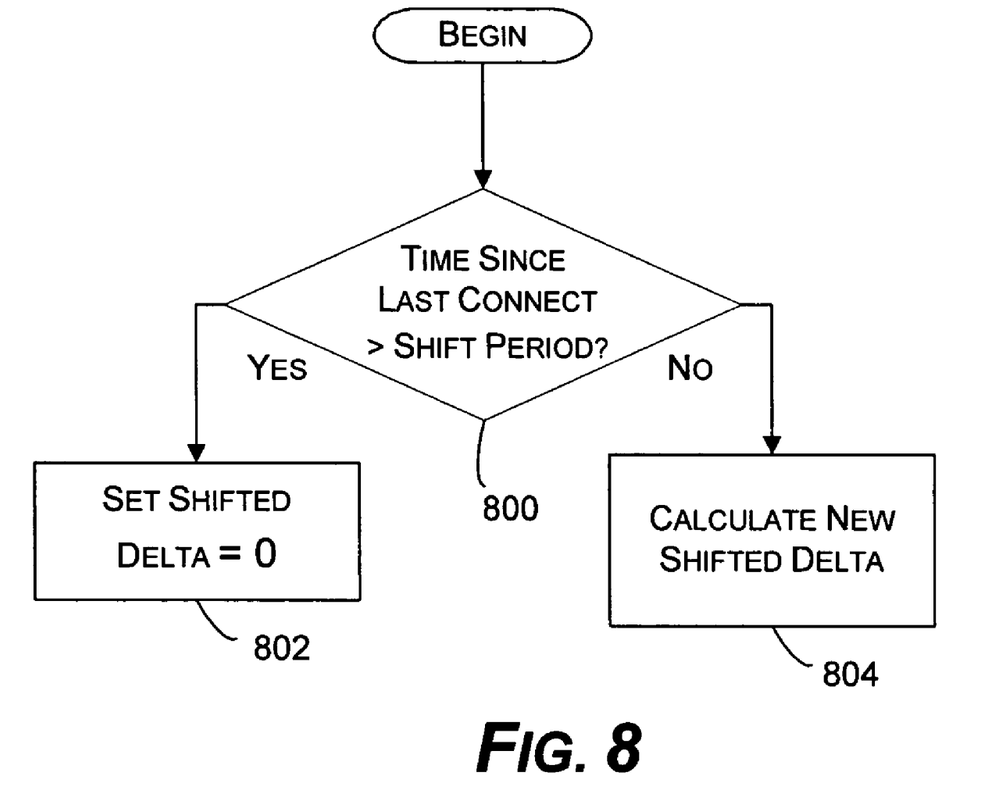
FIG. 8 is a flow diagram generally representing steps for generating shifted delta in accordance with an embodiment of the invention.

For example, a modified algorithm may utilize the methods shown in FIG. 8. Beginning at step 800, a determination is made if the time since the last connection is greater than a shift period, e.g., one day. If so, then a shifted_delta is set to zero at step 802. If not, a new shifted_delta is calculated at step 804. This new shifted_delta may be calculated, for example, by using the following formula:

$$\text{shifted\_delta} = \text{local\_delta} * ((\text{shift\_period} - (\text{system\_time} - \text{last\_set}))/\text{shift\_period})$$

wherein the shift_period is the time period defined above (e.g., one day), the system_time is the current connection time in which the shifted_delta is being calculated, and the last_set is the previous connection time.

The local_delta in the formula above may be calculated using a number of different factors, but typically is the local delta 406 last calculated for the node 400. In accordance with an embodiment, if the local delta has never been calculated for the node 400 (i.e., in the example above, upon first connection), then the local_delta in the shifting formula above may be calculated using the neighbor_delta calculation above, and the last_set time may be set to system_time. Thus, in such a case, the shifted_delta is equal to the neighbor_delta.

If local delta has been set in the past, then the local delta may be calculated using a weighting average as follows:

$$\text{local\_delta} = \text{shifted\_delta} * ((x-1)/x) + \text{neighbor\_delta} * (1/x))$$

Figure 9:
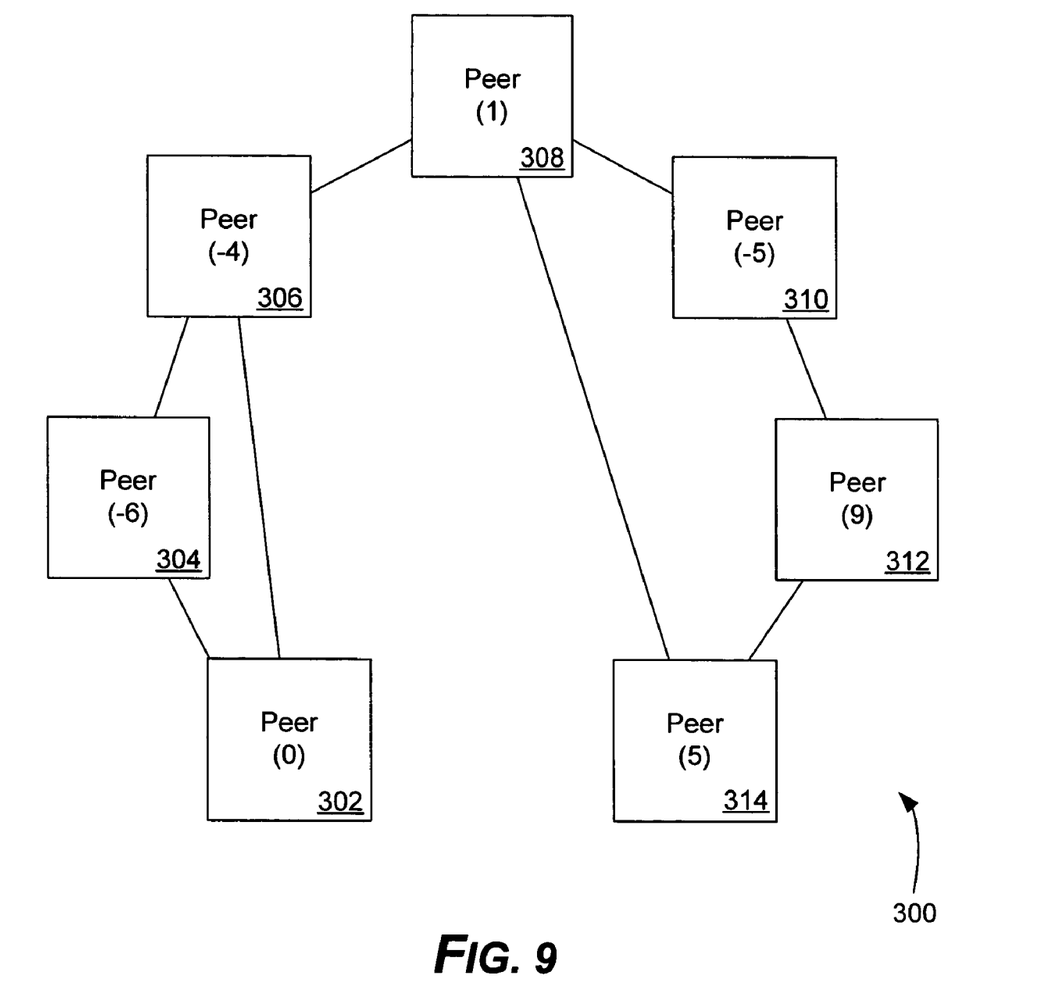
FIG. 9 is a schematic diagram of the graph of FIG. 3, showing shifted delta values that may be calculated in accordance of the invention.

The shifting factor described above is advantageous in that it minimizes the delta for each of the nodes 400 in a graph (e.g., the graph 300). This feature assures that the graph time remains close to Universal Coordinated Time (UTC), and prevents drifting of the graph time away from UTC. An example of the deltas after shifting has occurred in an ideal graph 300 is shown in FIG. 9. The example shows an perfect shift of the deltas of FIG. 7, and in reality, a shift may not be so flawless. As can be seen in the example, none of the peers 302-314 has a delta that is greater than the absolute value of 9, whereas before the deltas were as large as 15. If one or more of the nodes 302-314 began to have a delta value that shifted, then the shifting factor or shifted_delta equation above would work to maintain the delta close to a smaller value.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for maintaining a shared concept of time between nodes in a graph that comprises a peer to peer, serverless network wherein the nodes are peers on the network, the method comprising:
   at a first node in a graph in the peer to peer network, maintaining a perceived graph time representing a perception of a shared concept of time for the graph;
   at a second node in the graph in the peer to peer network, receiving information about the perceived graph time wherein receiving information occurs responsive to a connection request to join the peer to peer network by the second node and wherein the connection request is made to the first node, and
   calculating a local delta representative of a difference between the perceived graph time and a system time for the second node wherein calculating the local delta by the second node comprises assuming that a lag time in receiving the perceived graph time from the first node is one-half of a lag time between a time of the request for the connection by the second node and a time of a receipt of the perceived graph time by the second node;
   if a previous local delta has been calculated for the second node, the local delta is calculated as a weighted average of a neighbor delta wherein the neighbor delta is representative of a difference between the perceived graph time and a system time for the second node and wherein the calculation for the neighbor delta comprises adding the perceived graph time to one-half of the lag time to arrive at a sum, and subtracting the sum from a system time of the second node at the time of the receipt and the previous local delta wherein
      the weighted average is calculated using the following formula:

local delta=previous local delta*((x−1)/x)+(neighbor delta)*(1/x));

wherein x is a positive integer between 4 and 16, inclusive; and
   wherein previous local delta equals a previously calculated local delta and
   wherein the neighbor delta equals system time less graph time plus half delay
   wherein the delay equals system welcome time less system connect time;
   if a previous local delta has not been calculated for the second node, the local delta is equal to the neighbor delta.

2. The method of claim 1, wherein the information comprises the perceived graph time.

3. The method of claim 1, further comprising minimizing the local delta by applying a shift factor.

4. The method of claim 3, wherein applying a shift factor comprises: decreasing the local delta by a fraction of the time between a present calculation of local delta connection and a previous calculation of a previous local delta, divided by the shifting period.

5. The method of claim 4, wherein the present calculation comprises a request for connection to the graph, and the previous calculation comprises a most recent request for connection to the graph.

6. A computer storage medium having computer-executable instructions for performing a method, the method comprising:
   at a first node in a graph that comprises a peer to peer, serverless network wherein the nodes are peers on the network, maintaining a perceived graph time representing a perception of a shared concept of time for the graph;
   at a second node in the graph in the peer to peer network, receiving information about the perceived graph time, wherein receiving information occurs responsive to a connection request to join the peer to peer network by the second node and wherein the connection request is made to the first node, and
   calculating a local delta representative of a difference between the perceived graph time and a system time for the second node wherein calculating the local delta by the second node comprises assuming that a lag time in receiving the perceived graph time from the first node is one-half of a lag time between a time of the request for the connection by the second node and a time of a receipt of the perceived graph time by the second node;

if a previous local delta has been calculated for the second node, the local delta is calculated as a weighted average of a neighbor delta wherein
the calculation for the neighbor delta comprises adding the perceived graph time to one-half of the lag time to arrive at a sum, and subtracting the sum from a system time of the second node at the time of the receipt and the previous local delta wherein
the weighted average is calculated using the following formula:

$$\text{local delta} = \text{previous local delta} * ((x-1)/x) + (\text{neighbor delta}) * (1/x));$$

wherein x is a positive integer between 4 and 16, inclusive; and
wherein previous local delta equals a previously calculated local delta and
wherein the neighbor delta equals system time less graph time plus half delay wherein the delay equals system welcome time less system connect time;
if a previous local delta has not been calculated for the second node, the local delta is equal to the neighbor delta;
minimizing the local delta by applying a shift factor wherein applying a shift factor comprises:
decreasing the local delta by a fraction of the time between a present calculation of local delta connection and a previous calculation of a previous local delta, divided by the shifting period wherein
the present calculation comprises a request for connection to the graph, and the previous calculation comprises a most recent request for connection to the graph.

* * * * *